UNITED STATES PATENT OFFICE.

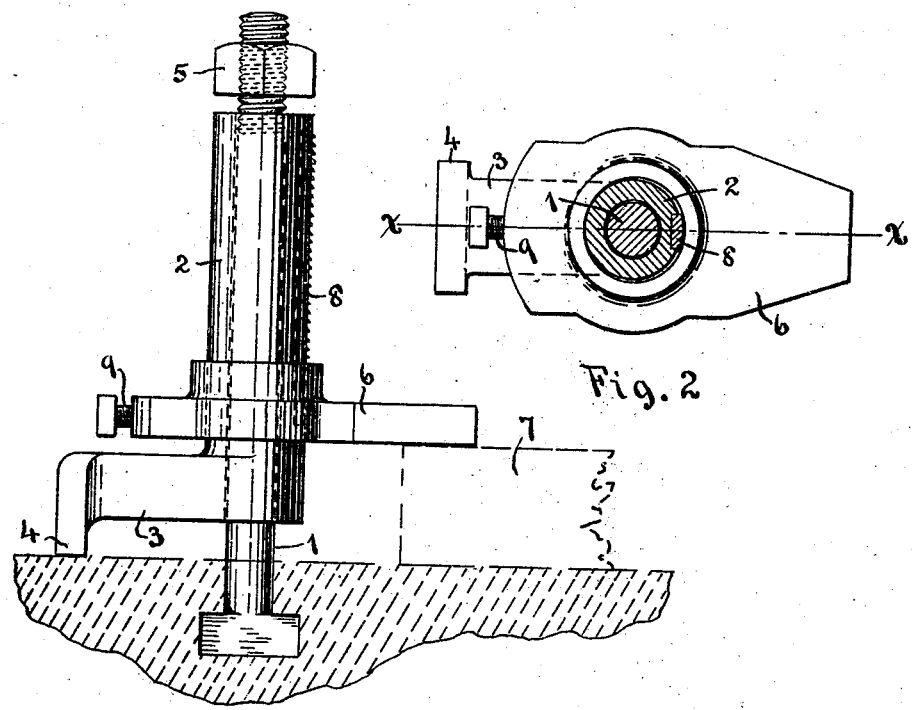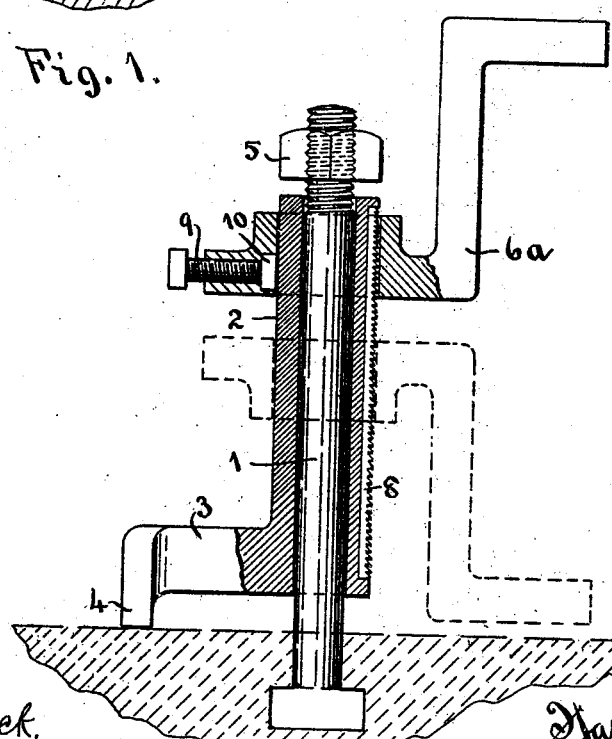

HARRY HOWELL, OF WAVERLY, NEW YORK.

WORK-CLAMP.

No. 928,657.   Specification of Letters Patent.   Patented July 20, 1909.

Application filed March 30, 1909. Serial No. 486,801.

*To all whom it may concern:*

Be it known that I, HARRY HOWELL, a citizen of the United States, residing at Waverly, in the county of Tioga and State of New York, have invented certain new and useful Improvements in Work-Clamps, of which the following is a specification.

This invention relates to improvements in the clamps for fastening work upon the tables of planers, shapers and other machine tools, which have bedplates, tables, or faceplates provided with T-slots, or through slots for receiving a clamping bolt; and the object of my improvements is to provide a clamp of this character which can be readily and quickly adjusted for any size of work without the use of blocking.

I attain my object by constructing the clamp in the manner illustrated in the accompanying drawings, in which—

Figure 1 presents a side elevation of the clamp, with a portion of a machine table or faceplate and a piece of work indicated in broken lines; Fig. 2, a plan view of the clamp, with the upper portion thereof shown in section; and Fig. 3, a side elevation with parts sectioned on the line x—x in Fig. 2, and showing a modification of the clamping bar.

Like numerals designate like parts in the several views.

The clamp consists of a bolt 1 of some length, provided with a head adapted to fit the T-slot of a machine table, faceplate, or the like; and upon the bolt, a sleeve 2, having a bore of diameter to loosely fit the bolt. Projecting from one side of this sleeve is an arm 3, having its extremity projecting downward at 4 to form a fulcrum for the clamp. A clamping bar 6 slips over the sleeve 2, so as to be adjustable up and down the sleeve; and the bolt is provided on its outer end with a nut 5, the large diameter of which corresponds with the diameter of the sleeve, so that the clamping bar 6 may slide on and off from the sleeve, should it be desired to substitute a clamping bar of a different form; as, for instance, that shown at 6ª in Fig. 3.

When clamping a piece of work in place, the bolt 1 will be slipped into position upon a machine table, faceplate, or the like, by inserting it in a T-slot, or passing it through an open slot therein, and the sleeve positioned thereon with bar 6 so adjusted as to have its free end resting upon the work, as indicated at 7 in Fig. 1. The nut 5 will then be screwed down upon the sleeve 2, thereby forcing the sleeve downward and tilting it toward the work on its fulcrum 4. This will cause the upper edge of the bore of the bar 6 to engage one of the teeth on the bar 8, which is inserted longitudinally in the sleeve on the work side, thereby preventing the bar from sliding on the sleeve and forcing its outward end down upon the work, to securely clamp it in place, as the sleeve is forced downward.

Instead of employing the teeth for securing the bar from movement on the sleeve I may provide a set screw 9, the inward end of which engages the block 10, inserted in the hub of the arm to prevent abrasion of the sleeve; or I may provide the bar with both devices. I prefer, however, to employ the teeth-bar 8, as the adjustments may be made quicker than with the set screw. I may also dispense with even the teeth-bar, and depend upon the tilt of the sleeve and consequent binding of the sleeve in the bore of the bar to prevent slippage of the bar on the sleeve when clamping pressure is applied by the nut 5.

Where the work to be fastened in place is too high for the straight bar 6 to be used, I may substitute therefor an angle bar, such as 6ª, shown in Fig. 3, either removing the bar 6 from the sleeve, or turning it around out of the way; and where the work is too low on the table to be reached by the straight bar, I may use the angle bar 6ª in reversed position, as shown in the broken line position in Fig. 3.

Without limiting myself in any way to the manner or means for fastening the clamping bar against slippage on the sleeve, what I claim as my invention and desire to secure by Letters Patent is—

1. A clamp comprising a bolt, a sleeve thereon having a fulcrum arm projecting from one end, a clamping bar adjustable longitudinally upon the sleeve, and a nut on the bolt to engage the sleeve at its other end.

2. A clamp comprising a bolt, a sleeve thereon having a fulcrum arm projecting from one end, a clamping bar adjustable longitudinally upon the sleeve, means for holding the bar from slipping on the sleeve when clamping pressure is applied, and a nut on the bolt to engage the sleeve at its other end.

3. A clamp comprising a bolt, a sleeve thereon having a fulcrum arm projecting from one end, a clamping bar adjustable longitudinally upon the sleeve, a plurality of transverse teeth extending longitudinally along the sleeve on the side opposite the fulcrum arm, and a nut on the bolt to engage the sleeve at its other end.

4. A clamp comprising a bolt, a sleeve thereon having a fulcrum arm projecting from one end, an angled clamping bar adjustable longitudinally upon the sleeve, and a nut on the bolt to engage the sleeve at its other end.

In testimony whereof I have affixed my signature, in presence of two witnesses.

HARRY HOWELL.

Witnesses:
J. B. HANNA,
T. L. SEVERN.